(12) United States Patent
Kamp et al.

(10) Patent No.: US 10,865,739 B2
(45) Date of Patent: Dec. 15, 2020

(54) VALVE SYSTEM

(71) Applicant: HAMILTON SUNDSTRAND CORPORATION, Charlotte, NC (US)

(72) Inventors: Josh Kamp, Glastonbury, CT (US); David J. Zawilinski, W. Granby, CT (US); Scott W. Simpson, Easthampton, MA (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 335 days.

(21) Appl. No.: 15/927,374

(22) Filed: Mar. 21, 2018

(65) Prior Publication Data

US 2019/0293025 A1   Sep. 26, 2019

(51) Int. Cl.
  *F02K 3/115* (2006.01)
  *B64D 13/08* (2006.01)
  (Continued)

(52) U.S. Cl.
  CPC .............. *F02K 3/115* (2013.01); *B64D 13/08* (2013.01); *F02C 6/08* (2013.01); *F02C 7/185* (2013.01);
  (Continued)

(58) Field of Classification Search
  CPC .. F02K 3/115; F02C 7/185; F02C 9/18; F02C 6/08; B64D 13/08; B64D 2013/0618; B64D 2013/0644; B64D 13/06; F16K 31/16; F16K 49/005; F05D 2260/213; F05D 2260/221; F04B 53/08; F04B 53/10; F28F 9/0234; F28F 2250/08; F28F 2250/10; F28F 2250/108; F28D 1/0233; F28D 1/0246; F28D 1/0408; F28D 1/0417; F28D 1/0426; F28D 2021/0021; F28D 2021/0026; F28D 2021/0082
  See application file for complete search history.

(56) References Cited

U.S. PATENT DOCUMENTS 2,452,170 A * 10/1948 Wenger .................... B60H 1/18
                                                                  237/12.3 A
3,513,907 A *  5/1970 Hughes ................. F28D 9/0093
                                                                    165/206
(Continued)

FOREIGN PATENT DOCUMENTS

EP       2985224 A1    2/2016
EP       3045709 A1    7/2016

OTHER PUBLICATIONS

European Search Report for Application No. 19162929.4, dated Jul. 18, 2019, 8 pages.

*Primary Examiner* — Jianying C Atkisson
*Assistant Examiner* — Jose O Class-Quinones
(74) *Attorney, Agent, or Firm* — Cantor Colburn LLP

(57) ABSTRACT

A valve system includes a heat exchanger disposed within a heat exchanger manifold. The heat exchanger manifold has a first face defining a first flow inlet and an exhaust outlet, a second face disposed opposite the first face and defining a second flow inlet, a third face extending between the first face and the second face, and a first side and a second side disposed opposite the first side. The first side and the second side each extend between the first face, the second face, and the third face. A first torque motor assembly is mounted to the first side. A second torque motor assembly is mounted to the second side.

12 Claims, 2 Drawing Sheets

(51) Int. Cl.
  *F02C 6/08* (2006.01)
  *F04B 53/08* (2006.01)
  *F04B 53/10* (2006.01)
  *F16K 31/16* (2006.01)
  *F02C 7/18* (2006.01)
  *F02C 9/18* (2006.01)
  *B64D 13/06* (2006.01)
  *F16K 49/00* (2006.01)

(52) U.S. Cl.
  CPC ............... *F02C 9/18* (2013.01); *F04B 53/08* (2013.01); *F04B 53/10* (2013.01); *F16K 31/16* (2013.01); *B64D 2013/0618* (2013.01); *B64D 2013/0644* (2013.01); *F05D 2210/30* (2013.01); *F05D 2260/213* (2013.01); *F05D 2260/221* (2013.01); *F16K 49/005* (2013.01)

(56) References Cited

U.S. PATENT DOCUMENTS

| | | | | |
|---|---|---|---|---|
| 5,199,426 A | * | 4/1993 | Aldworth | A62B 9/022 128/202.11 |
| 5,931,131 A | * | 8/1999 | Hackett | F02B 47/08 123/195 C |
| 6,060,691 A | * | 5/2000 | Minami | F16K 49/002 219/201 |
| 6,935,129 B2 | * | 8/2005 | Sasaki | B60H 1/00328 62/238.4 |
| 8,359,845 B2 | * | 1/2013 | Prior | F01N 5/02 60/320 |
| 2002/0069646 A1 | * | 6/2002 | Yeung | B64D 13/00 60/783 |
| 2003/0084887 A1 | * | 5/2003 | Veinotte | F02M 26/21 123/568.18 |
| 2007/0113575 A1 | * | 5/2007 | Borre | F16K 35/14 62/292 |
| 2008/0223563 A1 | * | 9/2008 | Penny | F28D 7/0041 165/166 |
| 2008/0314569 A1 | * | 12/2008 | Yamazaki | F02M 37/0029 165/153 |
| 2010/0326089 A1 | * | 12/2010 | Weber | F01D 17/145 60/783 |
| 2012/0102934 A1 | * | 5/2012 | Magnetto | F01M 5/001 60/320 |
| 2013/0284817 A1 | * | 10/2013 | Welle | B60H 1/00314 237/12.1 |
| 2016/0208694 A1 | | 7/2016 | Simpson et al. | |
| 2016/0341497 A1 | * | 11/2016 | Kitaguchi | F28F 27/02 |
| 2017/0058777 A1 | | 3/2017 | Army | |
| 2017/0210480 A1 | | 7/2017 | Lauder et al. | |
| 2017/0306794 A1 | | 10/2017 | Schwarz | |

\* cited by examiner

VALVE SYSTEM

BACKGROUND

Exemplary embodiments pertain to the art of fluid control valve systems.

A control mechanism may be provided with a fluid control valve system that controls the supply of pressure or flow from a pressure source to a downstream component. The downstream component may be a valve or other system component. The control mechanism may be subject to a harsh environment such as a high temperature environment or a high vibratory environment that may reduce the service life of the control mechanism. Accordingly, it is desirable to provide a more robust control mechanism.

BRIEF DESCRIPTION

Disclosed is a valve system that includes a heat exchanger manifold. The heat exchanger manifold has a first face disposed opposite a second face, a third face extending between distal ends of the first face and the second face, and a first side and a second side disposed opposite the first side. The first side and the second side each extend between the first face, the second face, and the third face. The first face defines an exhaust outlet and a first flow inlet. The second face defines a second flow inlet.

Also disclosed is a valve system provided with an environmental control system. The valve system includes a heat exchanger disposed within a heat exchanger manifold, a first torque motor assembly, and a second torque motor assembly. The heat exchanger manifold has a first face defining a first flow inlet and an exhaust outlet, a second face disposed opposite the first face and defining a second flow inlet, a third face extending between the first face and the second face, and a first side and a second side disposed opposite the first side. The first side and the second side each extend between the first face, the second face, and the third face. The first torque motor assembly is mounted to the first side. The second torque motor assembly is mounted to the second side.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
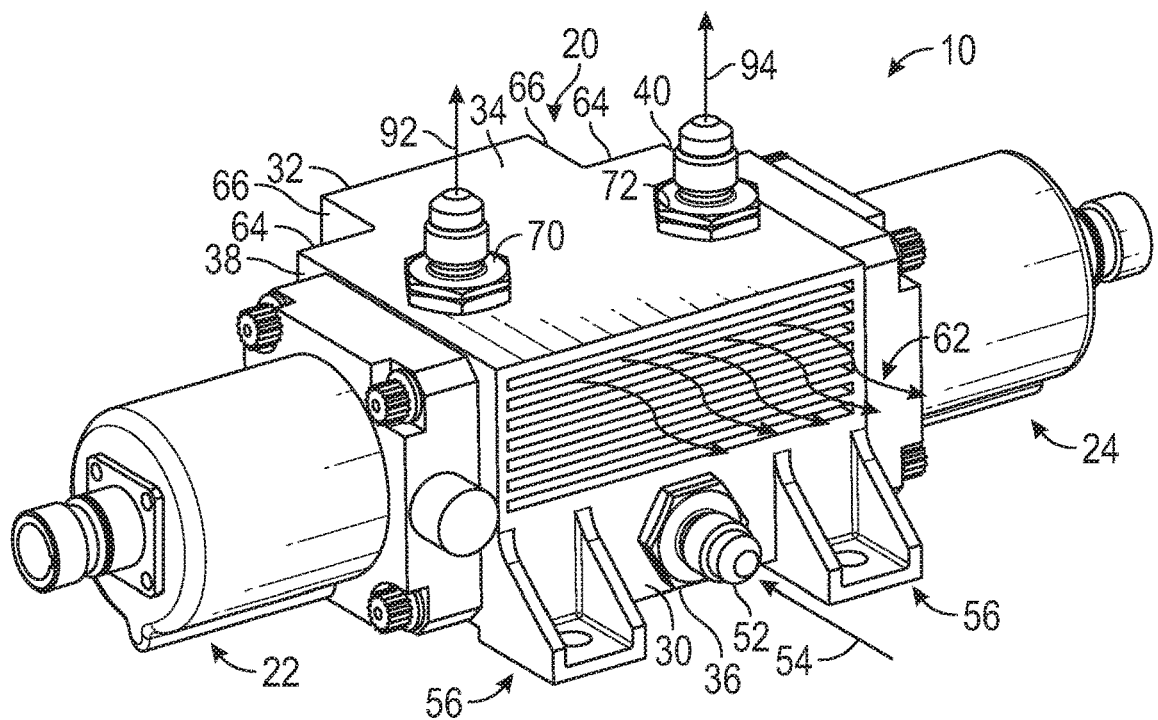
FIG. 1 is a first view of a valve system.
Figure 2:
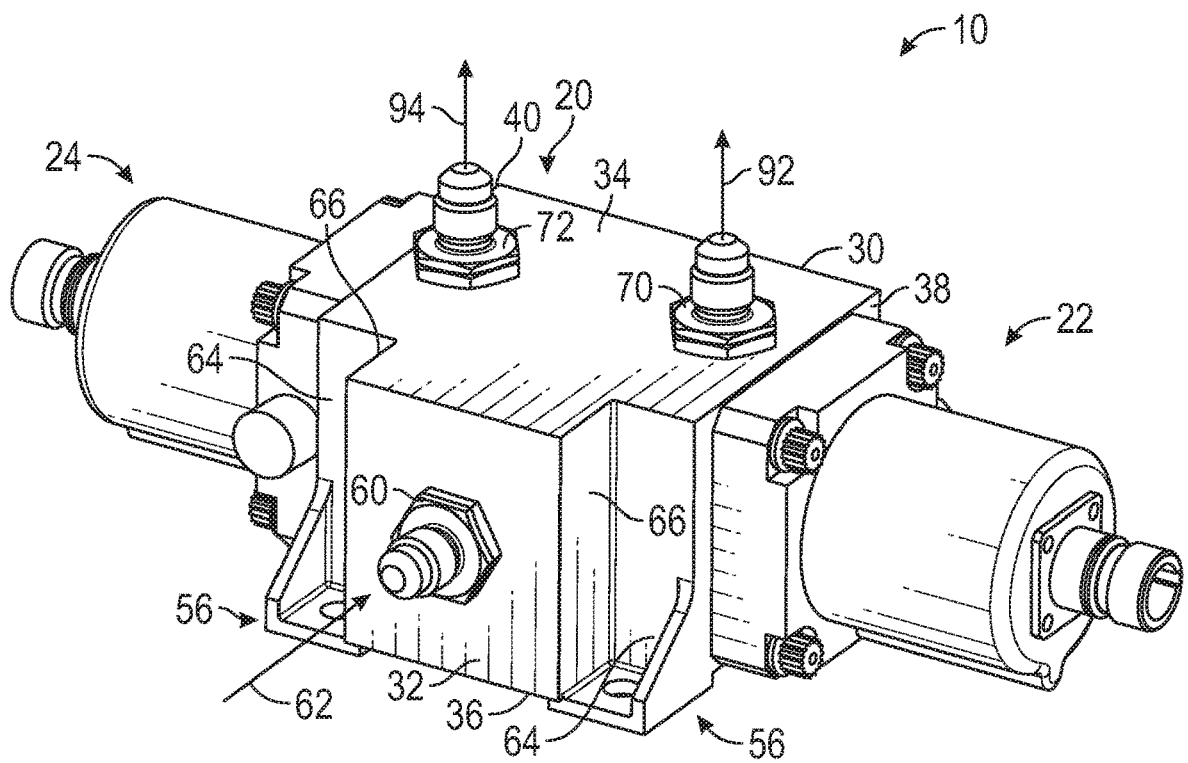
FIG. 2 is a second view of the valve system.

Referring to FIGS. 1 and 2, a valve system 10 is shown. The valve system 10 may be provided with an environmental control system that receives bleed air or bypass air from a gas turbine engine and provides conditioned air to various components or compartments of an aircraft. The valve system 10 may be mounted on or within the gas turbine engine, for example, on a fan case, a compressor case, or other static engine structure. The valve system 10 includes a heat exchanger manifold 20, a first torque motor assembly 22, and a second torque motor assembly 24.

The heat exchanger manifold 20 may be mounted to a static structure of the gas turbine engine. The heat exchanger manifold 20 includes a first face 30, a second face 32, a third face 34, a fourth face 36, a first side 38, and a second side 40.

The first face 30 may define an exhaust outlet 50 and a first flow inlet 52. The exhaust outlet 50 may be configured as an elongated opening having a grill, baffles, louvers, or the like disposed within or defining the elongated opening.

The first flow inlet 52 is spaced apart from the exhaust outlet 50. The first flow inlet 52 may be arranged as a fitting or other flow connection device that is disposed on or extends through the first face 30 or the second face 32. The first flow inlet 52 is arranged to receive a first fluid flow 54 from a first flow source at a first temperature. The first fluid flow 54 may be a hot air flow from a compressor stage from the gas turbine engine. A conduit may be directly attached to the first flow inlet 52 to provide the first fluid flow 54 to the heat exchanger manifold 20.

In at least one embodiment, mounting support 56 may be operatively connected to the first face 30 and disposed proximate a proximal end of the first face 30. The mounting support 56 are configured to receive a fastener to operatively couple the heat exchanger manifold 20 to a portion of the gas turbine engine.

Figure 3:
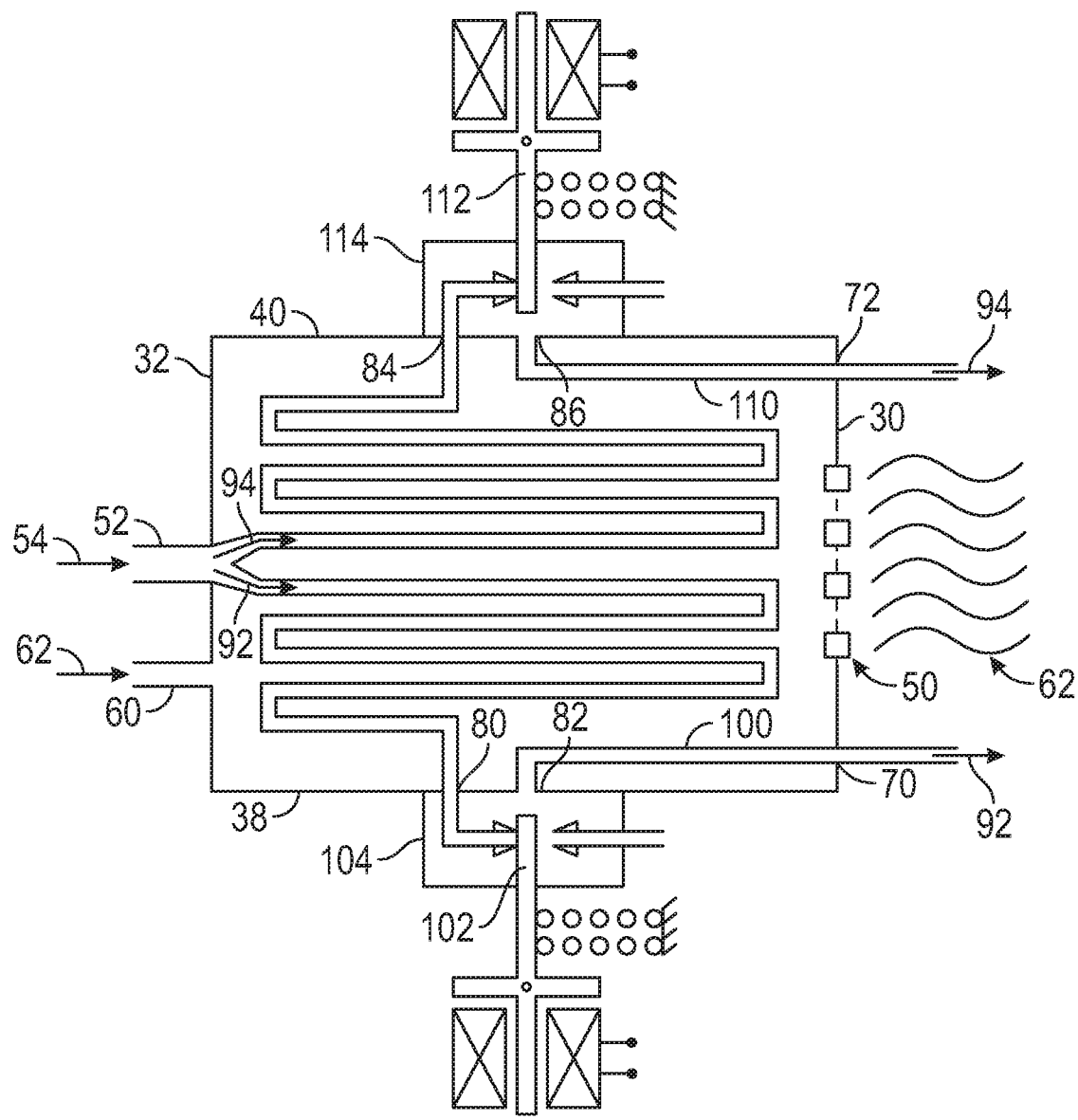
FIG. 3 is an internal view of the valve system.

The second face 32 is disposed opposite the first face 30. The second face 32 may define a second flow inlet 60. In some embodiments, the second face 32 may define both the second flow inlet 60 and the first flow inlet 52, as shown in FIG. 3. The second flow inlet 60 may be arranged as a fitting or other flow connection device that is disposed on or extend through the second face 32. The second flow inlet 60 is arranged to receive a second fluid flow 62 from a second flow source at a second temperature that is less than the first temperature. The second fluid flow 62 may be a cool air flow from a fan, a compressor stage, or other location from the gas turbine engine. A conduit or a conduit provided with insulation may be directly attached to the second flow inlet 60 to provide the second fluid flow 62 to the heat exchanger manifold 20. The direct attachment improves the cooling flow efficiency of the second fluid flow 62.

The second face 32 may be a projected face that extends from an end wall 64 that is disposed opposite and disposed parallel to the first face 30. A pair of sidewalls 66 may extend between the second face 32 and the end wall 64. The pair of sidewalls 66 may be disposed substantially perpendicular to the second face 32 and the end wall 64.

In at least one embodiment, additional mounting supports 56 may be provided and are operatively connected to at least one of the end wall 64 and/or the sidewalls 66. The mounting support 56 are configured to receive a fastener to operatively couple the heat exchanger manifold 20 to a portion of the gas turbine engine.

The third face 34 extends between distal ends of the first face 30 and the second face 32. The third face 34 also extends between distal ends of the end wall 64 and the sidewalls 66. The third face 34 defines a first flow outlet 70 and a second flow outlet 72.

The first flow outlet 70 is disposed proximate the first side 38. The first flow outlet 70 may be arranged as a fitting or other flow connection device that is disposed on or extends through the third face 34. The first flow outlet 70 is arranged to direct a reduced temperature or cooled fluid flow towards a valve or other fluid control device.

The second flow outlet 72 is disposed proximate the second side 40. The second flow outlet 72 may be arranged as a fitting or other flow connection device that is disposed on or extends through the third face 34. The second flow outlet 72 is arranged to direct a cooled fluid flow towards a valve or other fluid control device.

The fourth face 36 is disposed opposite the third face 34. The fourth face 36 extends between proximal ends of the first face 30 and the second face 32. The fourth face 36 may be disposed on or disposed proximate a portion of the gas turbine engine.

The first side 38 extends between the first face 30, the second face 32 (in some embodiments, the end wall 64), the third face 34, and the fourth face 36. The first side 38 may define a first inlet 80 and a first outlet 82. The first inlet 80 and the first outlet 82 are in fluid communication with the interior of the heat exchanger manifold 20.

The second side 40 is disposed opposite the first side 38. The second side 40 extends between the first face 30, the second face 32 (in some embodiments, the end wall 64), the third face 34, and the fourth face 36. The second side 40 may define a second inlet 84 and a second outlet 86. The second inlet 84 and the second outlet 86 are in fluid communication with the interior of the heat exchanger manifold 20.

A heat exchanger 90 is disposed within the heat exchanger manifold 20. The heat exchanger 90 is arranged to receive the first fluid flow 54 from the first flow inlet 52 and is arranged to receive the second fluid flow 62 from the second flow inlet 60. The heat exchanger 90 is arranged to cool the first fluid flow 54 using the second fluid flow 62 that flows about or around a series of channels that receive the first fluid flow 54 and the second fluid flow 62 is directed towards the exhaust outlet 50.

The heat exchanger 90 is arranged to split the first fluid flow 54 into a first portion 92 and a second portion 94, as the heat exchanger 90 cools the first fluid flow 54 from the first temperature to a third temperature that is less than the first temperature. The first portion 92 of the first fluid flow 54 at the third temperature is directed towards the first torque motor assembly 22. The second portion 94 of the first fluid flow 54 at the third temperature is directed towards the second torque motor assembly 24.

The first torque motor assembly 22 is mounted to the first side 38 of the heat exchanger manifold 20. The first torque motor assembly 22 is a flow control device that is arranged to receive the first portion 92 of the first fluid flow 54 through the first inlet 80 and is arranged to direct the first portion 92 of the first fluid flow towards the first flow outlet 70 through a first conduit 100. The first conduit 100 is fluidly connected to and extends between the first outlet 82 and the first flow outlet 70.

The first portion 92 of the first fluid flow 54 enters into the first torque motor assembly 22 through the first inlet 80. The first torque motor assembly 22 may move a first valve member 102, that extends into a first flow housing 104 coupled to the first side 38 of the heat exchanger manifold 20, from a first position in which the first portion 92 is inhibited from exiting torque motor assembly 22 towards a second position that facilitates or enables the first portion 92 to exit the first torque motor assembly 22 through the first outlet 82 and into the first conduit 100. The position of the first valve member 102 of the first torque motor assembly 22 may be controlled or commanded by a controller to vary or control an amount of the first portion 92 of the first fluid flow 54 that is provided to a downstream component.

The second torque motor assembly 24 is mounted to the second side 40 of the heat exchanger manifold 20. The second torque motor assembly 24 is a flow control device that is arranged to receive the second portion 94 the first fluid flow 54 through the second inlet 84 is arranged to direct the second portion 94 of the first fluid flow 54 towards the second flow outlet 72 through a second conduit 110. The second conduit 110 is fluidly connected to and extends between the second outlet 86 and the second flow outlet 72.

The second portion 94 of the first fluid flow 54 enters into the second torque motor assembly 24 through the second inlet 84. The second torque motor assembly 24 may move a second valve member 112, that extends into a second flow housing 114 coupled to the second side 40 of the heat exchanger manifold 20, from a first position in which the second portion 94 is inhibited from exiting the second torque motor assembly 24 towards a second position that facilitates or enables the second portion 94 to exit the second torque motor assembly 24 through the second outlet 86 and into the second conduit 110. The position of the second valve member 112 of the second torque motor assembly 24 may be controlled or commanded by a controller to vary or control an amount of the second portion 94 of the first fluid flow 54 that is provided to a downstream component such as a valve or other fluid control device.

The cooling of the first fluid flow 54 (e.g. the first portion 92 and/or the second portion 94) prior to entering into the torque motor assemblies, allows the torque motors to be used that have increased reliability as compared to certain previous methods. Furthermore, the use of two torque motor assemblies mounted to one heat exchanger manifold 20 reduces the packaging volume of the valve system 10.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A valve system, comprising:
   a heat exchanger manifold having a first face disposed opposite a second face, a third face extending between distal ends of the first face and the second face, and a first side and a second side disposed opposite the first side, the first side and the second side extending between the first face, the second face, and the third face, the first face defining an exhaust outlet and a first flow inlet that receives a first flow from a first flow source, the second face defining a second flow inlet that receives a second flow from a second flow source;

the third face defines a first flow outlet disposed proximate the first side through which a first portion of the first flow exits the valve system and a second flow outlet disposed proximate the second side through which a second portion of the first flow exits the valve system;

a first torque motor assembly mounted to the first side;

a first valve member that controls the flow of the first portion through the first torque motor and from the first flow inlet to the first flow outlet; and a heat exchanger in the heat exchanger manifold that receives the first fluid flow and cools the first fluid flow using the second fluid flow, delivers the first portion of the first fluid flow to the first torque motor assembly, and directs the second fluid flow towards the exhaust outlet.

2. The valve system of claim 1, wherein the first torque motor assembly is arranged to receive the first portion of the first fluid flow and direct the first portion of the first fluid flow to the first flow outlet.

3. The valve system of claim 1, further comprising:

a second torque motor assembly mounted to the second side; and a second valve member that controls the flow of a second portion of the first fluid flow received at the first flow inlet through the second torque motor.

4. The valve system of claim 3, wherein the heat exchanger delivers the second portion of the first fluid flow to the second torque motor assembly.

5. The valve system of claim 4, wherein the second torque motor assembly is arranged to receive the second portion of the first fluid flow and direct the second portion of the first fluid flow to the second flow outlet.

6. A valve system, comprising:

a heat exchanger disposed within a heat exchanger manifold having a first face defining a first flow inlet and an exhaust outlet, a second face disposed opposite the first face and defining a second flow inlet, a third face extending between the first face and the second face, and a first side and a second side disposed opposite the first side, the first side and the second side extending between the first face, the second face, and the third face;

a first torque motor assembly mounted to the first side;

a second torque motor assembly mounted to the second side;

a first valve member that controls the flow of a first portion of a first fluid flow received at the first flow inlet through the first torque motor; and a second valve member that controls the flow of a second portion of the first fluid flow received at the first flow inlet through the second torque motor.

7. The valve system of claim 6, wherein the third face defines a first flow outlet disposed proximate the first side and a second flow outlet disposed proximate the second side.

8. The valve system of claim 7, wherein the first flow inlet is arranged to receive the first fluid flow at a first temperature from a first flow source and the second flow inlet is arranged to receive a second fluid flow at a second temperature from a second flow source.

9. The valve system of claim 8, wherein the heat exchanger receives the first fluid flow and cools the first fluid flow using the second fluid flow, delivers a first portion of the first fluid flow at a third temperature to the first torque motor assembly, and directs the second fluid flow towards the exhaust outlet.

10. The valve system of claim 9, wherein the heat exchanger receives the first fluid flow and cools the first fluid flow using the second fluid flow, delivers a second portion of the first fluid flow at the third temperature to the second torque motor assembly, and directs the second fluid flow towards the exhaust outlet.

11. The valve system of claim 10, wherein the first torque motor assembly is arranged to receive the first portion of the first fluid flow and direct the first portion of the first fluid flow to the first flow outlet.

12. The valve system of claim 10, wherein the second torque motor assembly is arranged to receive the second portion of the first fluid flow and direct the second portion of the first fluid flow to the second flow outlet.

* * * * *